US011433342B2

(12) United States Patent
Yang (10) Patent No.: US 11,433,342 B2
(45) Date of Patent: Sep. 6, 2022

(54) FRAME-TYPE AIR PURIFIER

(71) Applicant: SAUBER TECHNOLOGY LIMITED, Taipei (TW)

(72) Inventor: Kuan-Li Yang, Taipei (TW)

(73) Assignee: SAUBER TECHNOLOGY LIMITED, Taipei (TW)

( * ) Notice: Subject to any disclaimer, the term of this patent is extended or adjusted under 35 U.S.C. 154(b) by 344 days.

(21) Appl. No.: 16/798,276

(22) Filed: Feb. 21, 2020

(65) Prior Publication Data

US 2020/0269175 A1  Aug. 27, 2020

(30) Foreign Application Priority Data

Feb. 22, 2019 (TW) .................................. 108106129

(51) Int. Cl.
*B01D 46/00* (2022.01)
*B01D 46/52* (2006.01)

(52) U.S. Cl.
CPC ..... *B01D 46/0045* (2013.01); *B01D 46/0004* (2013.01); *B01D 46/521* (2013.01); *B01D 46/0005* (2013.01); *B01D 2265/00* (2013.01)

(58) Field of Classification Search
CPC ............ B01D 46/0004; B01D 46/0005; B01D 46/0045; B01D 2265/00; B01D 46/521; B01D 46/10; B01D 2273/30; F24F 8/10; F24F 8/108; F24F 1/028; F24F 1/029; F24F 1/04; F22F 1/035
See application file for complete search history.

(56) References Cited

U.S. PATENT DOCUMENTS 5,762,667 A * 6/1998 Pippel ....................... F24F 8/10
55/482
5,803,940 A * 9/1998 Rick ..................... F24F 1/0071
55/467

(Continued)

FOREIGN PATENT DOCUMENTS

CN       1825005 A      8/2006
KR    10-0457980 B1    11/2004

OTHER PUBLICATIONS

Taiwan Patent Office, Office Action, Patent Application Serial No. TW 108106129, dated Aug. 12, 2019.

*Primary Examiner* — Robert Clemente
(74) *Attorney, Agent, or Firm* — Rabin & Berdo, P.C.

(57) ABSTRACT

A frame-type air purifier includes a purifier housing and a front cover. The purifier housing includes a rear plate and a circumferential plate. The circumferential plate surrounds an outer periphery of the rear plate and forms a basin-shaped space. The basin-shaped space is divided into an open chamber and a close chamber. The open chamber includes a front opening. The close chamber includes an air inlet. The close chamber receives a purifier body. The front cover includes a front plate and a side frame. The side frame surrounds an outer periphery of the front plate and extends towards the rear plate. The front cover covers the front opening without contacting. The front plate and the circumferential plate are spaced by a longitudinal spacing. The side frame and the circumferential plate are spaced by a lateral spacing. The longitudinal spacing and the lateral spacing form an L-shaped air inlet channel.

10 Claims, 7 Drawing Sheets

(56) References Cited

U.S. PATENT DOCUMENTS

| | | | | |
|---|---|---|---|---|
| 5,840,092 | A * | 11/1998 | Rick | B01D 46/10 55/495 |
| 5,935,282 | A * | 8/1999 | Lin | B01D 46/10 55/501 |
| 2005/0005585 | A1* | 1/2005 | Kim | B01D 46/4263 55/467.1 |
| 2005/0011171 | A1* | 1/2005 | Lee | B01D 46/4263 55/471 |
| 2007/0221061 | A1* | 9/2007 | Steiner | F24F 8/10 55/467 |
| 2010/0293907 | A1* | 11/2010 | Zheng | B01D 46/62 55/337 |
| 2011/0006216 | A1* | 1/2011 | Searle | F24F 1/0071 250/455.11 |
| 2011/0083757 | A1* | 4/2011 | Shore | F24F 13/20 361/679.01 |
| 2018/0296957 | A1* | 10/2018 | Yang | B01D 46/10 |
| 2018/0296958 | A1* | 10/2018 | Yang | B01D 46/0005 |
| 2019/0107302 | A1* | 4/2019 | Liu | H04W 4/80 |
| 2019/0381439 | A1* | 12/2019 | Liu | F24F 8/10 |
| 2021/0113948 | A1* | 4/2021 | Shin | B01D 46/0036 |

* cited by examiner

FRAME-TYPE AIR PURIFIER

CROSS-REFERENCE TO RELATED APPLICATION

This non-provisional application claims priority under 35 U.S.C. § 119(a) to Patent application No. 108106129 in Taiwan, R.O.C. on Feb. 22, 2019, the entire contents of which are hereby incorporated by reference.

BACKGROUND

Technical Field

The instant disclosure relates to an air purifier and, more particularly, to a frame-type air purifier.

Related Art

Along with the developing of industry and the increasing of vehicles, the air quality of the environment is rapidly getting worse. Suspended particles in the air increase significantly. These suspended particles can stay in the atmosphere for a very long time and can enter the human body by breathing. These suspended particles can be accumulated in the trachea or lung to negatively affect the vessel system of the human body to cause allergy, asthma, lung cancer, and cardiovascular disease. People's health can be damaged.

Therefore, many people may use air purifiers to purify the air in home or in the office to ease the harm caused by the contaminants in the air. Nonetheless, a convention air purifier is of floor type and needs to be placed on the floor, which occupies too much indoor space and negatively affects indoor traffic flow and appearance aesthetics.

SUMMARY

To address the above issue, an embodiment of the instant disclosure provides a frame-type air purifier comprising a purifier housing and a front cover. The purifier housing comprises a rear plate and a circumferential plate. The circumferential plate surrounds an outer periphery of the rear plate and forms a basin-shaped space. The basin-shaped space is divided into an open chamber and a close chamber. The open chamber comprises a front opening disposed on a side opposite to the rear plate. The close chamber comprises an air inlet disposed on a side close to the open chamber. The air inlet and the open chamber communicate with each other. The close chamber receives a purifier body. The front cover comprises a front plate and a side frame. The side frame surrounds an outer periphery of the front plate and extends towards the rear plate. The front cover covers the front opening of the open chamber without contacting. The front plate and the circumferential plate are spaced to maintain a longitudinal spacing. The side frame and the circumferential plate are spaced to maintain a lateral spacing. The longitudinal spacing and the lateral spacing form an L-shaped air inlet channel, so that external air is capable of flowing through the L-shaped air inlet channel and the front opening to the open chamber.

Concisely, according to the embodiment of the instant disclosure of the frame-type air purifier, the L-shaped air inlet channel can be formed by the longitudinal spacing and the lateral spacing, wherein the longitudinal spacing is maintained between the front plate of the front cover and the circumferential plate, and the lateral spacing is maintained between the side frame extending towards the rear plate and the circumferential plate, so that the L-shaped air inlet channel needs no additional processing and can be concealed, which improves the appearance aesthetics of the frame-type air purifier, simplifies the manufacturing process, and is benefit to a thinner design.

DETAILED DESCRIPTION

Figure 1:
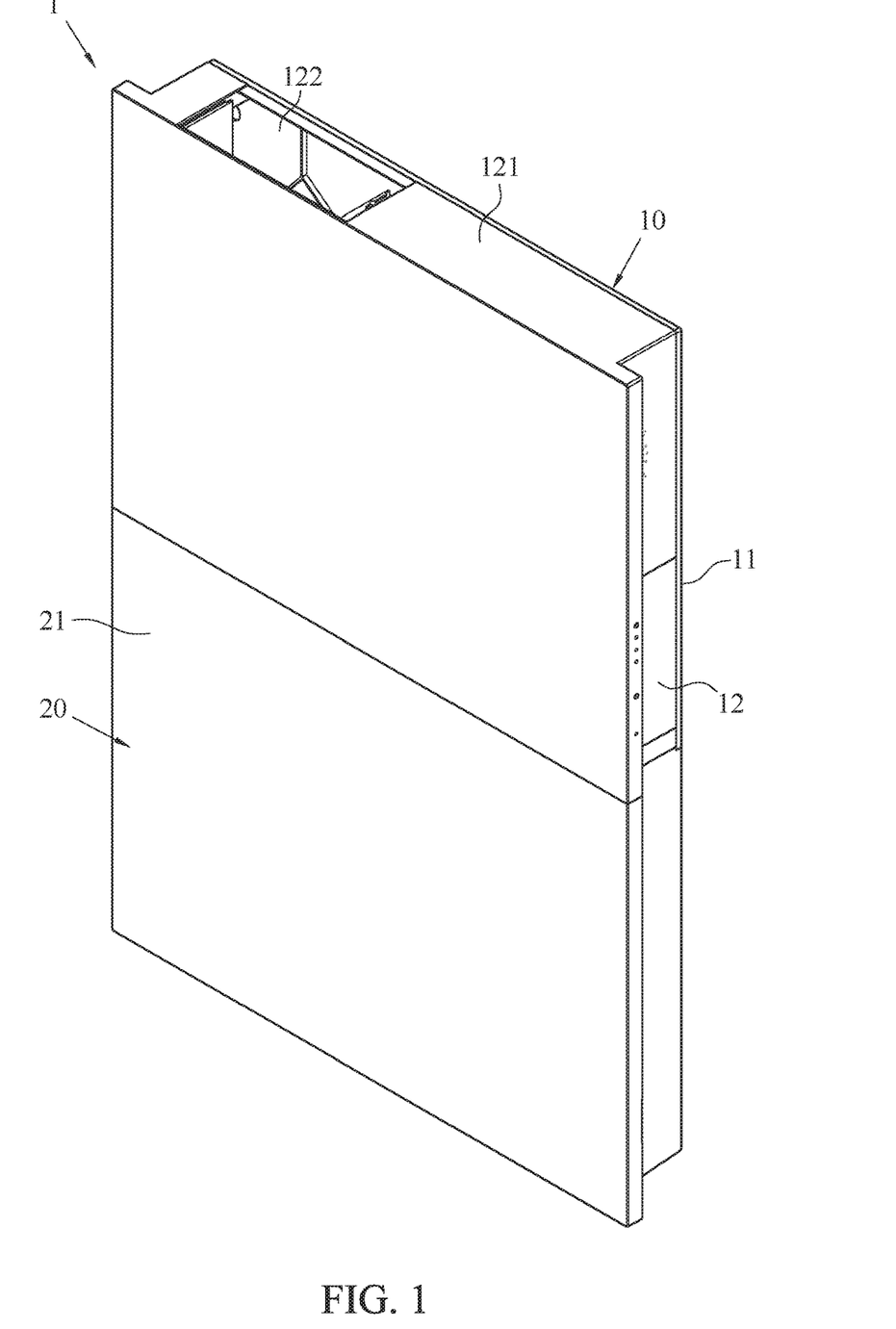
FIG. 1 illustrates a perspective view of a frame-type air purifier according to an embodiment of the instant disclosure.
Figure 2:
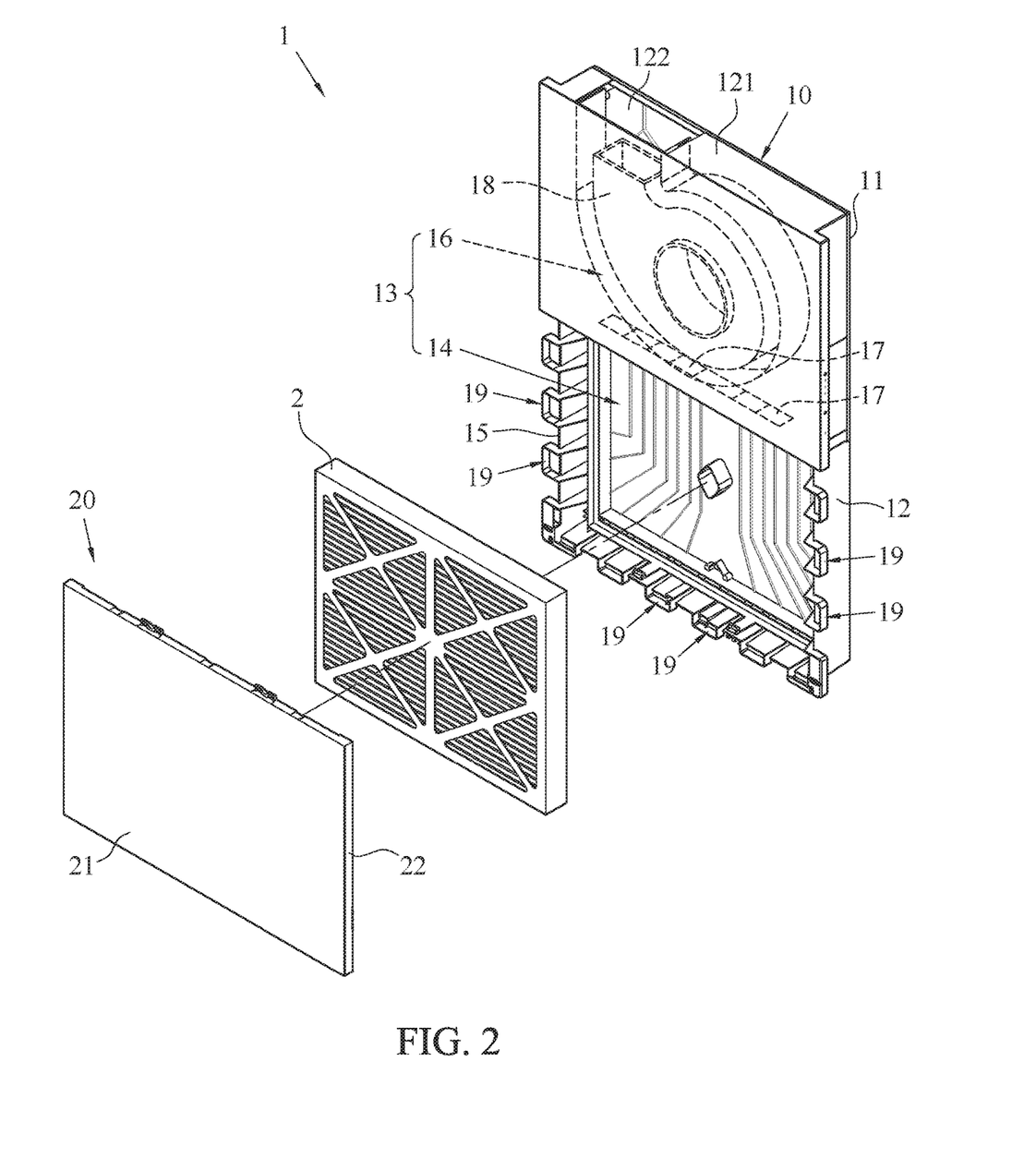
FIG. 2 illustrates an exploded view of the frame-type air purifier according to an embodiment of the instant disclosure.
Figure 3:
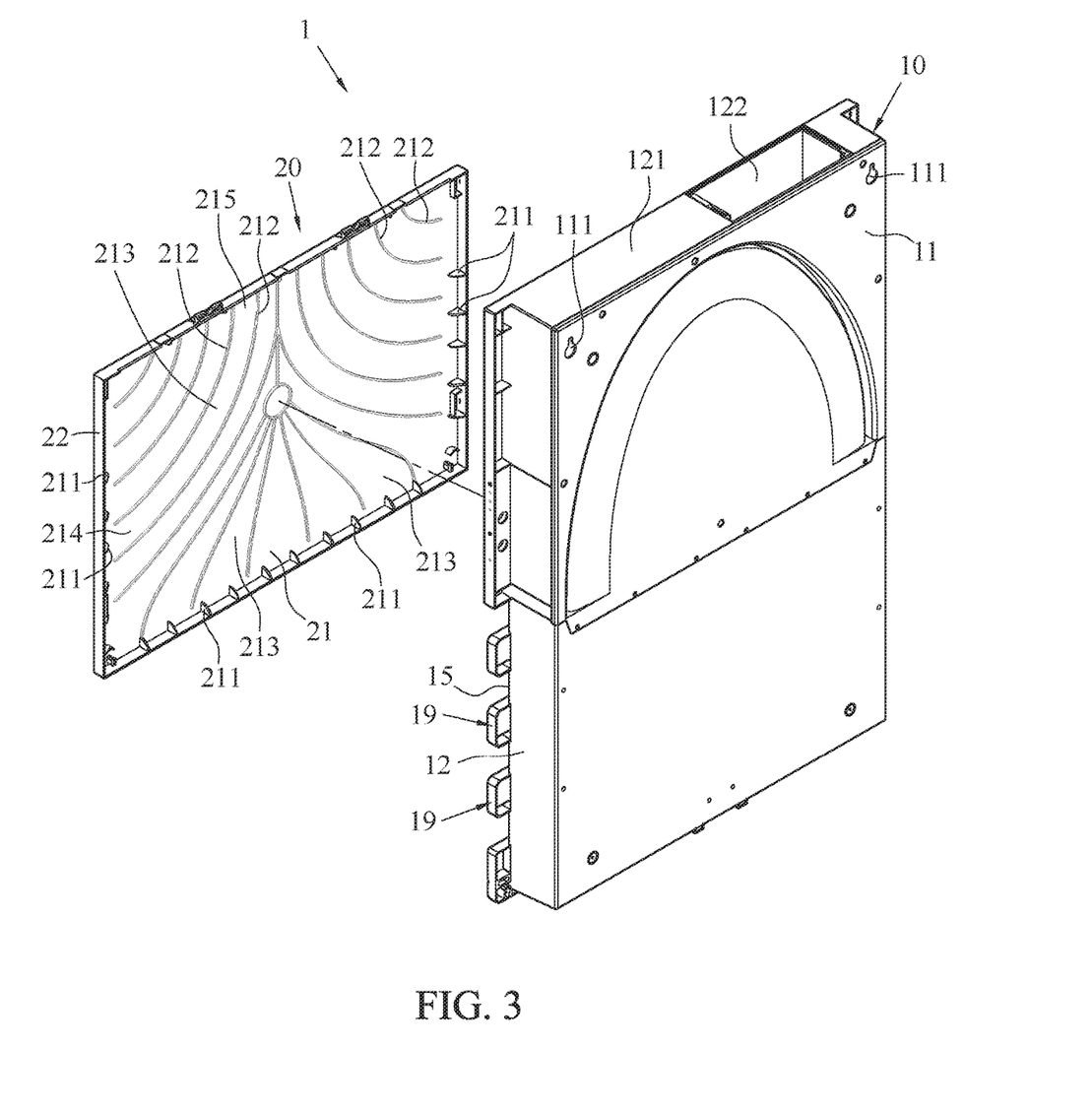
FIG. 3 illustrates another exploded view of the frame-type air purifier according to an embodiment of the instant disclosure.

FIG. 1 is a perspective view of a frame-type air purifier according to an embodiment of the instant disclosure. FIG. 2 is an exploded view of the frame-type air purifier according to an embodiment of the instant disclosure. FIG. 3 is another exploded view of the frame-type air purifier according to an embodiment of the instant disclosure. As shown in FIG. 1 to FIG. 3, the frame-type air purifier 1 of the embodiment of the instant disclosure comprises a purifier housing 10 and a front cover 20. The frame-type air purifier 1 can be hung on a wall to filtrate air of indoor environment, and a picture or another object (such as a painting, a photo, a mirror, or a writing pad) can be hung on the frame-type air purifier 1.

In some embodiments, the purifier housing 10 can be a hollow housing which is rectangular, square, or of another shape. As shown in FIG. 1 to FIG. 3, in the embodiment, the purifier housing 10 is a rectangular, hollow housing and comprises a rear plate 11 and a circumferential plate 12. The circumferential plate 12 surrounds an outer periphery of the rear plate 11 and forms a basin-shaped space 13. The rear plate 11 can be provided with a wall-fixing member 111 (as shown in FIG. 3). For instance, the wall-fixing member 111 can be a hook, a hook hole, or a lock hole, such that the purifier housing 10 can be hung on and fixed to the wall by the wall-fixing member 111.

Figure 4:
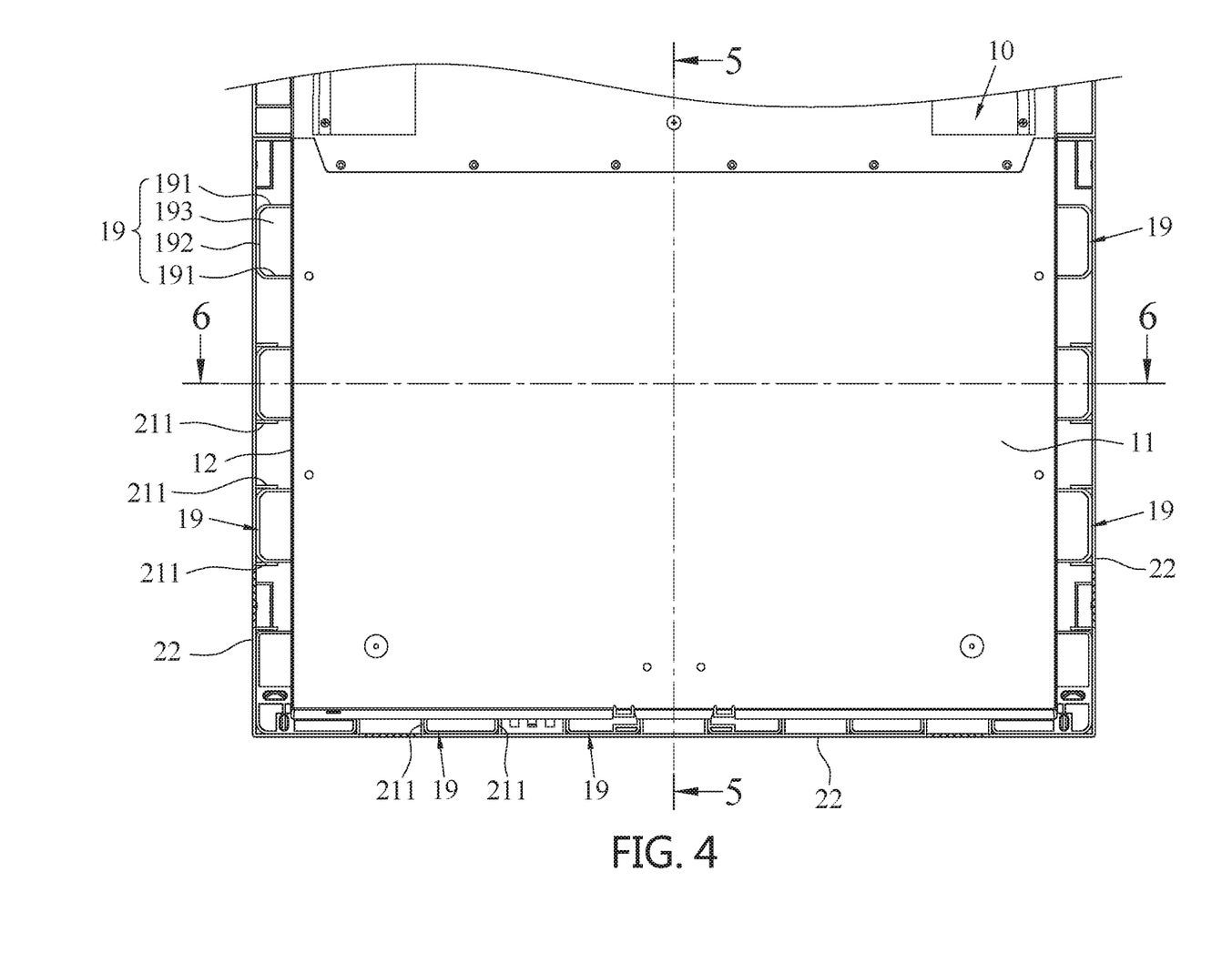
FIG. 4 illustrates a partially rear view of the frame-type air purifier according to an embodiment of the instant disclosure.
Figure 5:
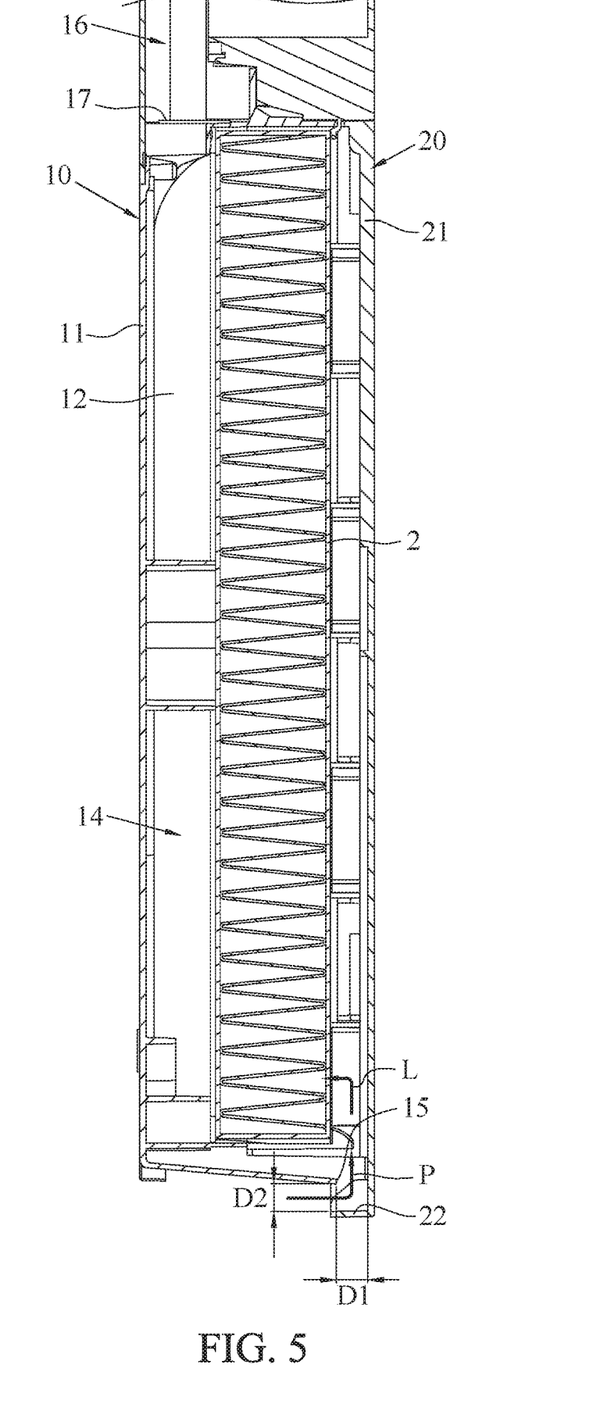
FIG. 5 illustrates a cross sectional view along the line 5-5 of FIG. 4.
Figure 6:
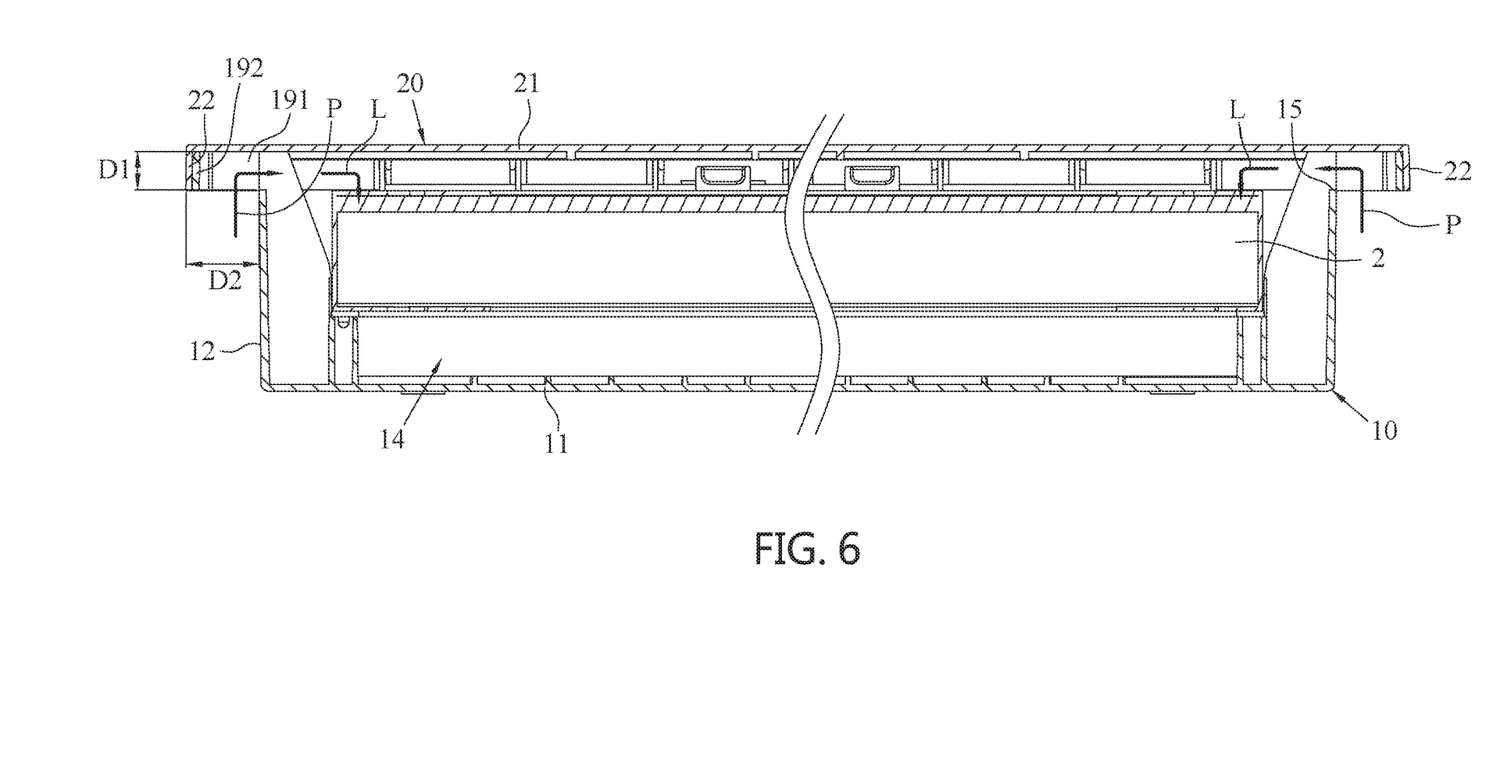
FIG. 6 illustrates a cross sectional view along the line 6-6 of FIG. 4.

As shown in FIG. 2 and FIG. 4 to FIG. 6, FIG. 4 is a partially rear view of the frame-type air purifier according to an embodiment of the instant disclosure, FIG. 5 is a cross sectional view along the line 5-5 of FIG. 4, and FIG. 6 is a cross sectional view along the line 6-6 of FIG. 4. In the embodiment, the basin-shaped space 13 is divided into an open chamber 14 and a close chamber 16, in which the close chamber 16 is at an upper half of the purifier housing 10, and the open chamber 14 is at a lower half of the purifier housing 10. Nonetheless, it is not for limitation. There may be another arrangement of the open chamber 14 and the close chamber 16 (for instance, the open chamber 14 and the close chamber 16 may be respectively at a left half and a right half of the purifier housing 10). In addition, the open chamber 14 comprises a front opening 15 disposed on a side opposite to the rear plate 11, and the close chamber 16 comprises at least one air inlet 17 disposed on a side close to the open chamber 14 (there are multiple air inlets 17 in the embodiment). Each air inlet 17 and the open chamber 14 communicate with each other.

As shown in FIG. 2 and FIG. 4 to FIG. 6, the front cover 20 covers the front opening 15 of the open chamber 14 without contacting the front opening 15 and is spaced from the front opening 15. The front cover 20 comprises a front plate 21 and at least one side frame 22. The side frame 22 may be disposed along an outer periphery of the front plate 21 and extend towards the rear plate 11. For instance, in the embodiment, the front cover 20 comprises several side frames 22. The side frames 22 are respectively disposed on a bottom side and two opposite sides of the front plate 21 to form a U-shaped frame to surround the outer periphery of the front plate 21. The side frames 22 respectively extend towards the rear plate 11. As shown in FIG. 6, the front plate 21 of the front cover 20 covers the front opening 15 of the open chamber 14; however, the front plate 21 and the circumferential plate 12 are spaced to maintain a longitudinal spacing D1 without contacting the front opening 15. In addition, the outer periphery of the front plate 21 is protruded from the circumferential plate 12 to have each side frame 22 of the front cover 20 and the circumferential plate 12 spaced to maintain a lateral spacing D2. Each side frame 22 covers the longitudinal spacing D1 between the front plate 21 and the circumferential plate 12. As a result, the longitudinal spacing D1 and the lateral spacing D2 form an L-shaped air inlet channel P (as shown in FIG. 5 and FIG. 6.), so that external air is capable of flowing through the L-shaped air inlet channel P and the front opening 15 to the open chamber 14.

As shown in FIG. 2, in the embodiment, the close chamber 16 receives a purifier body 18. For instance, the purifier body 18 may have an air blower (e.g., an axial-flow blower, a centrifugal blower, or a cross-flow blower). The open chamber 14 is a screen receiving camber and is provided for receiving an air screen 2. While there is a need to replace the air screen 2, the front cover 20 can be detached from the front opening 15 of the open chamber 14 to provide a function of rapid replacement of the air screen 2. Nonetheless, the above embodiment is merely an example. The air screen 2 may also be disposed in the close chamber 16, in the open chamber 14, or in the air inlet 17 between the open chamber 14 and the close chamber 16.

Accordingly, as shown in FIG. 5 and FIG. 6, during the operation of the purifier body 18, the external air can be introduced into the purifier housing 10 through the L-shaped air inlet channel P from the rear of the front cover 20. Next, the external air turns (as shown by an arrow L) and enters the open chamber 14 through the front opening 15, such that contaminants in the air (e.g., suspended particles, bacteria, and dirt) can be filtrated by the air screen 2 in the open chamber 14, and filtrated, clean air can enter the close chamber 16 through the air inlet 17 upwards and can be exhausted to outside;

therefore, the effect of purifying environmental air can be met.

According to the embodiment of the instant disclosure, the L-shaped air inlet channel P can be formed by the longitudinal spacing D1 and the lateral spacing D2, wherein the longitudinal spacing D1 is maintained between the front plate 21 of the front cover 20 and the circumferential plate 12, and the lateral spacing D2 is maintained between each side frame 22 extending towards the rear plate 11 and the circumferential plate 12, so that the L-shaped air inlet channel P needs no additional processing. In other words, after the front cover 20 covers the front opening 15 of the open chamber 14, the L-shaped air inlet channel P can be formed without additional processing (e.g., processing of forming openings on the front cover 20 or the circumferential plate 12). As a result, the manufacturing process can be simplified, and the cost of manufacturing can be lower.

In addition, due to each of the side frames 22 extending towards the rear plate 11, the L-shaped air inlet channel P can be covered by each side frame 22 and thus can be concealed. Therefore, while the frame-type air purifier 1 is hung on the wall or leaned against the wall, there is no any inlet holes seen from the external of the frame-type air purifier 1, and thus the appearance aesthetics of the frame-type air purifier 1 can be improved.

Moreover, during the operation of the purifier body 18 of the embodiment of the instant disclosure, the external air can be introduced into the purifier housing 10 through the L-shaped air inlet channel P from the rear of the front cover 20 and can turn (as shown by an arrow L) and enter the open chamber 14 through the front opening 15 to form a U-shaped flowing route. As a result, the frame-type air purifier 1 is benefit to a thinner design.

As shown in FIG. 1 and FIG. 2, in an embodiment, the circumferential plate 12 of the purifier housing 10 has a top plate 121. The top plate 121 is provided with an air outlet 122. The air outlet 122 communicates with the close chamber 16. Accordingly, the external air entering the open chamber 14 can be filtrated by the air screen 2 and the air entering the close chamber 16 can be exhausted from the purifier housing 10 through the air outlet 122 of the top plate 121. Therefore, while the frame-type air purifier 1 is hung on the wall, there is no any inlet holes seen from the external of the frame-type air purifier 1, and thus the appearance aesthetics of the frame-type air purifier 1 can be improved.

In an embodiment, the circumferential plate 12 of the purifier housing 10 is further extended with at least one assembling member 19. The assembling member 19 is in the L-shaped air inlet channel P for being accordingly assembled to the outer periphery of the front cover 20, such that the front cover 20 can be positioned stably. As shown in FIG. 2 and FIG. 4 to FIG. 6, in the embodiment, the circumferential plate 12 is further extended with multiple assembling members 19. The assembling members 19 extend from two sides and a bottom side of the circumferential plate 12 for being assembled to two sides and a bottom side of the front cover 20. Nonetheless, it is not for limitation. The assembling members 19 may only extend from the two sides or the bottom side of the circumferential plate 12.

As shown in FIG. 3 to FIG. 6, in the embodiment, each assembling member 19 is a U-shaped member. Each assembling member 19 comprises two extending plates 191 spaced from each other and a connecting plate 192 connected between the two extending plates 191. The two extending plates 191 and the connecting plate 192 surround to form a ventilating opening 193. The outer periphery of the front plate 21 of the front cover 20 may be assembled to all of or a part of the assembling members 19. For instance, an inner surface of the front plate 21 close to the rear plate 11 is provided with a plurality of assembling plates 211. The assembling plates 211 may be respectively against the extending plate 191 of the corresponding assembling member 19. The two extending plates 191 are further against the inner surface of the front plate 21. The connecting plate 192 is against the side frame 22, such that the outer periphery of the front cover 20 can be positioned stably. In addition, since each assembling member 19 is a U-shaped member and forms the ventilating opening 193, the external air will not be blocked by each assembling member 19 while entering each L-shaped air inlet channel P, such that the maximum air flow can be reached. According to the above illustration, the circumferential plate 12 of the purifier housing 10 is further extended with multiple U-shaped assembling members 19 for being accordingly assembled to the outer periphery of the front cover 20, such that the front cover 20 can be positioned stably, and the air flow will not be affected. In addition, each assembling member 19 is in the L-shaped air inlet channel P, so that while the frame-type air purifier 1 is hung on the wall or leaned against the wall, there is no any assembling members 19 seen from the external of the frame-type air purifier 1, and thus the appearance aesthetics of the frame-type air purifier 1 can be improved.

Nonetheless, the above embodiments are merely examples. In other embodiments, each assembling member 19 extended from the circumferential plate 12 of the purifier housing 10 may merely have the extending plate 191 for being accordingly assembled to the outer periphery of the front cover 20. For instance, the assembling plates 211 of the front plate 21 may be respectively against the extending plate 191 of the corresponding assembling member 19. The extending plate 191 may be further against the inner surface of the front plate 21. An end of the extending plate 191 is against the side frame 22. While the external air enters each L-shaped air inlet channel P, the external air can be introduced from spacing between each of the extending plates 191 and will not be blocked to affect the air flow.

Figure 7:
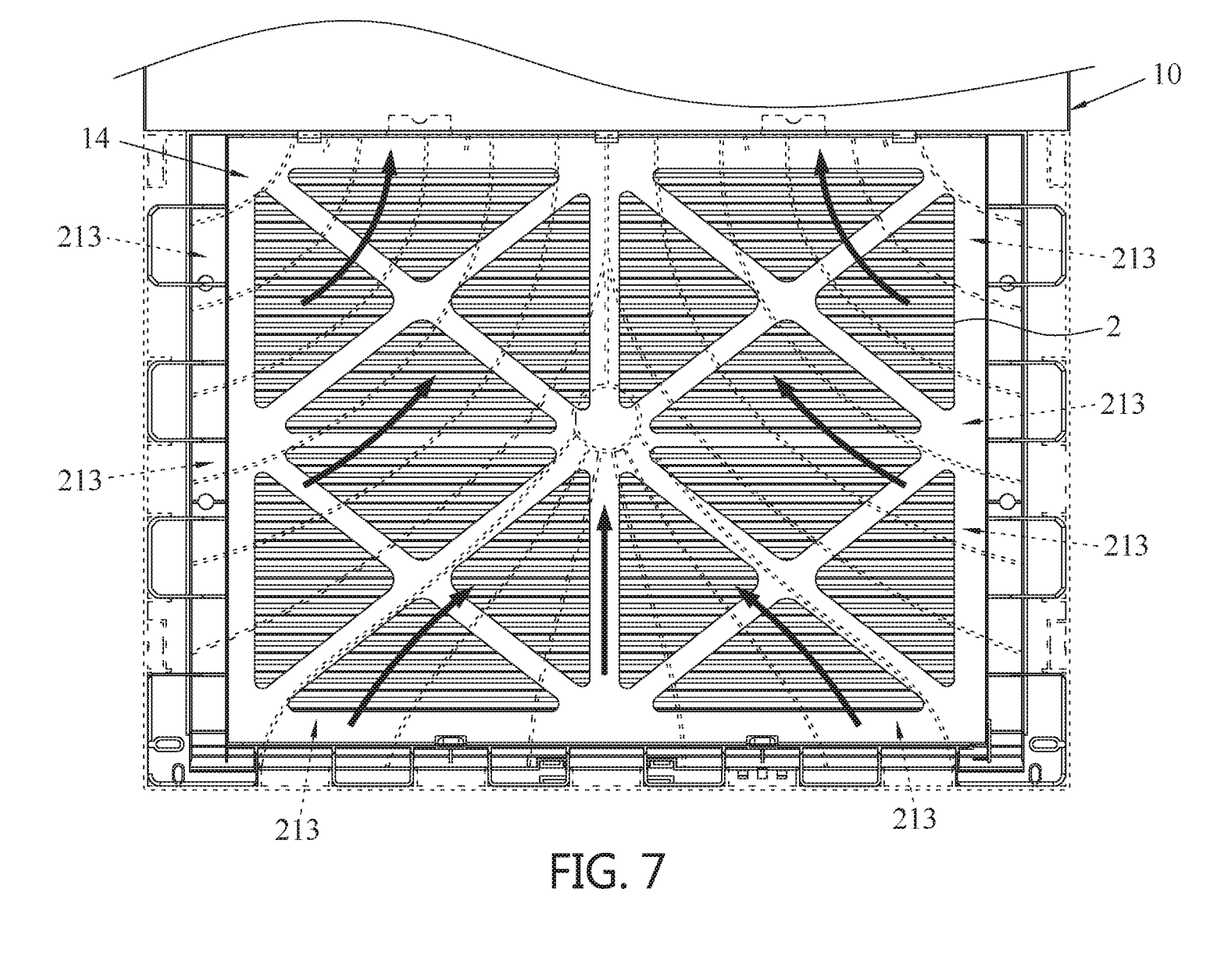
FIG. 7 illustrates a partially front view of the frame-type air purifier according to an embodiment of the instant disclosure.

As shown in FIG. 3 and FIG. 7, wherein FIG. 7 is a partially front view of the frame-type air purifier according to an embodiment of the instant disclosure, in the embodiment, the inner surface of the front plate 21 of the front cover 20 close to the rear plate 11 is provided with a plurality of air guiding ribs 212. The air guiding ribs 212 form a plurality of air guiding channels 213 therebetween. In other words, the inner surface of the front plate 21 is provided with two or more air guiding ribs 212. Every two air guiding ribs 212 form one air guiding channel 213 therebetween to guide the external air entering the L-shaped air inlet channel P. In FIG. 7, the front cover 20 is shown in a transparent manner to clearly present the air guiding ribs 212 of the front plate 21, the air guiding channels 213, and the air flowing routes. In the embodiment, the air guiding channels 213 are disposed in a radial arrangement. Each air guiding channel 213 comprises an inlet end 214 and an outlet end 215. The inlet ends 214 are close to the L-shaped air inlet channel P. The outlet ends 215 of a part of the air guiding channels 213 are close to a center of the open chamber 14, and the outlet ends 215 of the other part of the air guiding channels 213 are close to a top of the open chamber 14. Accordingly, after the external air enters the purifier housing 10 through the L-shaped air inlet channel P from the rear, the external air can be guided from the inlet end 214 of each air guiding channel 213 to the outlet end 215 and enter a center and a top of the air screen 2 (as shown in FIG. 7), such that the contaminants in the external air will not be accumulated in a portion of the air screen 2 close to the inlet ends 214. Instead, the contaminants can be guided to the center and the top of the air screen 2 in advance and be gradually accumulated from the center and the top towards a circumferential direction along with the time of use, so as to fully use every region of the air screen 2. The filtration effect and the lifespan of the air screen 2 can be improved.

While the instant disclosure has been described by way of example and in terms of the preferred embodiments, it is to be understood that the instant disclosure needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. A frame-type air purifier, comprising:
a purifier housing comprising a rear plate and a circumferential plate, the circumferential plate surrounding an outer periphery of the rear plate and forming a basin-shaped space, the basin-shaped space being divided into an open chamber and a close chamber, the open chamber comprising a front opening disposed on a side opposite to the rear plate, the close chamber comprising an air inlet disposed on a side close to the open chamber, the air inlet and the open chamber communicating with each other, and the close chamber receiving a purifier body; and
a front cover comprising a front plate and a side frame, the side frame surrounding an outer periphery of the front plate and extending towards the rear plate, wherein the front cover covers the front opening of the open chamber without contacting the front opening and is spaced from the front opening, the front plate and the circumferential plate are spaced to maintain a longitudinal spacing, the side frame and the circumferential plate are spaced to maintain a lateral spacing, the longitudinal spacing and the lateral spacing form an L-shaped air inlet channel, so that external air is capable of flowing through the L-shaped air inlet channel and the front opening to the open chamber.

2. The frame-type air purifier of claim 1, wherein the circumferential plate is extended with an assembling member, the assembling member is in the L-shaped air inlet channel, and the front cover is assembled to the assembling member.

3. The frame-type air purifier of claim 2, wherein the assembling member comprises an extending plate, an inner surface of the front plate is protruded with an assembling plate, and the assembling plate is against an upside of the extending plate.

4. The frame-type air purifier of claim 2, wherein the assembling member is a U-shaped member, the U-shaped member comprises two extending plates spaced from each other and a connecting plate connected between the two extending plates, and the two extending plates and the connecting plate surround to form a ventilating opening.

5. The frame-type air purifier of claim 4, wherein the two extending plates are against the inner surface of the front plate.

6. The frame-type air purifier of claim 4, wherein the connecting plate is against the side frame.

7. The frame-type air purifier of claim 1, wherein the open chamber is a screen receiving chamber.

8. The frame-type air purifier of claim 7, wherein an inner surface of the front plate is provided with two air guiding ribs, and the two air guiding ribs form an air guiding channel therebetween.

9. The frame-type air purifier of claim 8, wherein the air guiding channel comprises an inlet end and an outlet end, the inlet end is close to the L-shaped air inlet channel, and the outlet end is close to a center or a top of the screen receiving chamber.

10. The frame-type air purifier of claim 1, wherein the circumferential plate of the purifier housing comprises a top plate, the top plate is provided with an air outlet, and the air outlet communicates with the close chamber.

\* \* \* \* \*